United States Patent
Shafer

(10) Patent No.: US 7,549,205 B2
(45) Date of Patent: Jun. 23, 2009

(54) ASSEMBLY AND METHOD FOR PRE-STRESSING A MAGNETIC COUPLING CANISTER

(75) Inventor: Clark Shafer, Bolingbrook, IL (US)

(73) Assignee: PeopleFlo Manufacturing Inc., Franklin Park, IL (US)

(*) Notice: Subject to any disclaimer, the term of this patent is extended or adjusted under 35 U.S.C. 154(b) by 672 days.

(21) Appl. No.: 11/166,843

(22) Filed: Jun. 24, 2005

(65) Prior Publication Data

US 2006/0288560 A1    Dec. 28, 2006

(51) Int. Cl.
*B23P 11/02*    (2006.01)
*B23P 21/00*    (2006.01)
*F04B 17/00*    (2006.01)

(52) U.S. Cl. .............................. 29/446; 29/719; 417/420

(58) Field of Classification Search .................... 29/446, 29/525, 428, 601, 607, 506, 516, 719, 744; 417/420
See application file for complete search history.

(56) References Cited

U.S. PATENT DOCUMENTS

| | | | |
|---|---|---|---|
| 4,011,120 A | 3/1977 | Aggen | |
| 4,080,112 A | 3/1978 | Zimmermann | |
| 4,514,153 A | 4/1985 | Sudbeck et al. | |
| 4,549,341 A | 10/1985 | Kasabian | |
| 4,617,726 A | 10/1986 | Denk | |
| 4,625,135 A | 11/1986 | Kasabian | |
| 4,722,661 A | 2/1988 | Mizuno | |
| 4,752,194 A | 6/1988 | Wienen et al. | |
| 4,792,712 A | 12/1988 | Stokes | |
| 4,869,654 A | 9/1989 | Klaus | |
| 4,998,863 A | 3/1991 | Klaus | |
| 5,017,102 A | 5/1991 | Shimaguchi et al. | |
| 5,066,200 A | 11/1991 | Ooka | |
| 5,090,944 A | 2/1992 | Kyo et al. | |
| 5,154,587 A | 10/1992 | Mori et al. | |
| 5,160,246 A | 11/1992 | Horiuchi | |
| 5,175,461 A | 12/1992 | Zigler et al. | |
| 5,184,945 A | 2/1993 | Chi-Wei | |
| 5,237,737 A | 8/1993 | Zigler et al. | |
| 5,269,664 A | 12/1993 | Buse | |
| 5,464,333 A | 11/1995 | Okada et al. | |
| 5,831,364 A | 11/1998 | Buse | |
| 5,881,447 A | 3/1999 | Molnar | |
| 5,992,007 A | 11/1999 | Morii et al. | |
| 5,993,176 A | 11/1999 | Kingsford et al. | |
| 6,084,330 A | 7/2000 | Fisher et al. | |
| 6,097,125 A | 8/2000 | Park et al. | |

(Continued)

FOREIGN PATENT DOCUMENTS

JP    01-125591    5/1989

(Continued)

*Primary Examiner*—John C Hong
(74) *Attorney, Agent, or Firm*—Cook Alex Ltd.

(57) ABSTRACT

An assembly for pre-stressing a canister within a magnetically coupled device having a housing body, a housing head and a canister connectable to the housing body, a pin and pin plate combination disposed between the housing head and the canister, and wherein the housing body, housing head, pin and pin plate combination and canister are adapted to cause the canister to stretch in a longitudinal direction when the housing head and canister are connected in sealing engagement with the housing body. A method of stretching a magnetic coupling canister also is disclosed.

20 Claims, 11 Drawing Sheets

U.S. PATENT DOCUMENTS

| | | |
|---|---|---|
| 6,270,324 B1 | 8/2001 | Sullivan et al. |
| 6,293,773 B1 | 9/2001 | Doberstein et al. |
| 6,324,745 B1 | 12/2001 | Poag et al. |
| 6,443,710 B1 | 9/2002 | Tatsukami et al. |
| 6,457,951 B2 | 10/2002 | Rennett et al. |
| 6,607,370 B2 | 8/2003 | Fukamachi et al. |
| 6,710,476 B2 | 3/2004 | Tanozaki et al. |
| 6,712,585 B2 | 3/2004 | Iehl et al. |
| 2003/0011262 A1 | 1/2003 | Joho |
| 2004/0131485 A1 | 7/2004 | Shi |
| 2004/0223864 A1 | 11/2004 | Miller et al. |

FOREIGN PATENT DOCUMENTS

| | | |
|---|---|---|
| JP | 03-074599 | 3/1991 |
| JP | 2000161280 | 6/2000 |

ASSEMBLY AND METHOD FOR PRE-STRESSING A MAGNETIC COUPLING CANISTER

BACKGROUND OF THE INVENTION

1. Field of the Invention

The present invention generally relates to rotary magnetic couplings, also known as magnetic drives or magnetic clutches, and more particularly to an assembly and method for pre-stressing a canister in a magnetic coupling device where the canister is positioned between an inner magnet assembly and an outer magnet assembly to statically seal a fluid chamber.

2. Discussion of the Prior Art

In many rotating devices such as pumps, it is desirable to avoid potential seal leakage by not using seals in conjunction with rotating parts. Accordingly, it has become more common to employ a magnetically coupled drive system to eliminate the need for seals along rotating surfaces. While such devices may still employ static seals, because of their lack of dynamic or rotational seals, they have become known as "sealless". Indeed, magnetic drive structures have been used in the design of various pumps, including positive displacement gear pumps. Magnetic couplings or drive systems also may be used for example, in devices such as mixers, valves, compressors, clutches, and the like.

In prior art magnetically coupled devices, it is common to have a canister, otherwise known as a can, barrier, containment member, shell or sleeve, which separates an inner or driven magnet assembly and the fluid therearound, from an outer or drive magnet assembly. Such prior art canisters typically are a cylindrical, thin walled shell having a base with a flange which is connected or mounted between housing portions that may be referred to as a casing or housing body, and a housing head. Unfortunately, the fatigue life of prior art canisters is limited, in part due to cyclic hydraulic pressure loads to which the canister is subjected. Prior art canisters frequently are designed with thicker wall structures to handle such cyclic pressure loads. This unfortunately results in a less efficient magnetic coupling and greater heat generation. Also, if the canister is designed to support or hold an end of a shaft or pin, such as by use of a pin plate, it is common to require great care in the tolerances of such support or pin plate which is to be positioned within such prior art canister.

Accordingly, it is desirable to lengthen the fatigue life of a canister or containment member, or to otherwise make a canister less susceptible to the fatigue of common pressure fluctuations, while minimizing canister wall thickness. It also would be advantageous to reduce the burden of tolerances in manufacturing and to make an assembly for which the pin plate is more easily installed within a canister, and which is self-centering when the device is finally assembled.

The present invention addresses shortcomings in prior art magnetically coupled devices, while providing the above mentioned desirable features.

SUMMARY OF THE INVENTION

The purpose and advantages of the invention will be set forth in and apparent from the description and drawings that follow, as well as will be learned by practice of the invention.

The present invention is generally embodied in an assembly for pre-stressing a canister within a magnetically coupled device, and a method of accomplishing the same. The assembly has a housing body, a housing head, a canister connectable to the housing body, and a pin and pin plate combination disposed between the housing head and the canister. The housing body, housing head, pin and pin plate combination and canister are adapted to cause the canister to stretch in a longitudinal direction when the housing head and canister are connected in sealing engagement with the housing body.

The invention also generally provides a method of pre-stressing a canister within a magnetically coupled device.

In a first aspect of the invention, the assembly for pre-stressing a canister within a magnetically coupled device includes at least a housing body having at least one portion, a housing head connectable to the housing body, a canister having a side wall, an open end and a closed end, the canister being connectable to the at least one housing portion of the housing body adjacent the canister open end, a pin and pin plate combination disposed between the housing head and the canister closed end, and wherein the at least one housing portion, the housing head, the pin and pin plate combination and the canister are adapted to cause the canister to stretch in a longitudinal direction when the housing head and the canister are connected in sealing engagement with the housing body.

In another aspect of the invention, the canister side wall collapses inward as the canister is stretched in the longitudinal direction.

In a further aspect of the invention, the pin and pin plate are automatically centered relative to the canister when the canister side wall collapses inward.

In still another aspect of the invention, a method of pre-stressing a canister within a magnetically coupled device is presented and includes at least the steps of selecting a housing body having at least one housing portion and a housing head that is connectable to said housing body, selecting a canister having a side wall, an open end and a closed end, selecting a pin and pin plate combination and positioning the pin and pin plate combination between the housing head and the canister closed end, connecting the canister adjacent the canister open end to the housing body in sealing engagement with the housing body and connecting the housing head to the housing body in sealing engagement with the housing body, thereby moving the pin and pin plate combination toward the closed end of the canister and causing the canister to stretch in a longitudinal direction.

In yet a further aspect of the invention, a method of pre-stressing a canister within a magnetically coupled device is provided and includes at least the steps of selecting a housing body of a magnetically coupled device having at least one housing portion, a housing head that is connectable to the housing body, and a canister that is connectable to the housing body, selecting and placing a pin portion and a pin plate portion in respective positions wherein the pin plate portion will engage an inner end wall of the canister while a first end of the pin portion will engage the pin plate portion and a second end of the pin portion will engage the housing head, connecting the canister and housing head to the housing body and in sealing engagement with the housing body, thereby stretching the canister in a longitudinal direction.

Thus, the present invention presents an alternative assembly for pre-stressing a magnetic coupling canister that may be used in magnetically driven devices that require a seal between the magnetic drive and driven components. The components when assembled pre-stress the canister by stretching it in the longitudinal direction. The resultant pre-stress extends the fatigue life of the canister, and permits use of canisters having a thinner side wall. The present invention also simplifies the structures by utilizing a self centering structure for a pin plate within a canister which further compensates for tolerances in axial clearances while intentionally pre-stressing the canister. The invention further presents a method of pre-stressing a canister within a magnetically coupled device.

It is to be understood that both the foregoing general description and the following detailed description are exemplary and provided for purposes of explanation only, and are not restrictive of the invention, as claimed. Further features and objects of the present invention will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
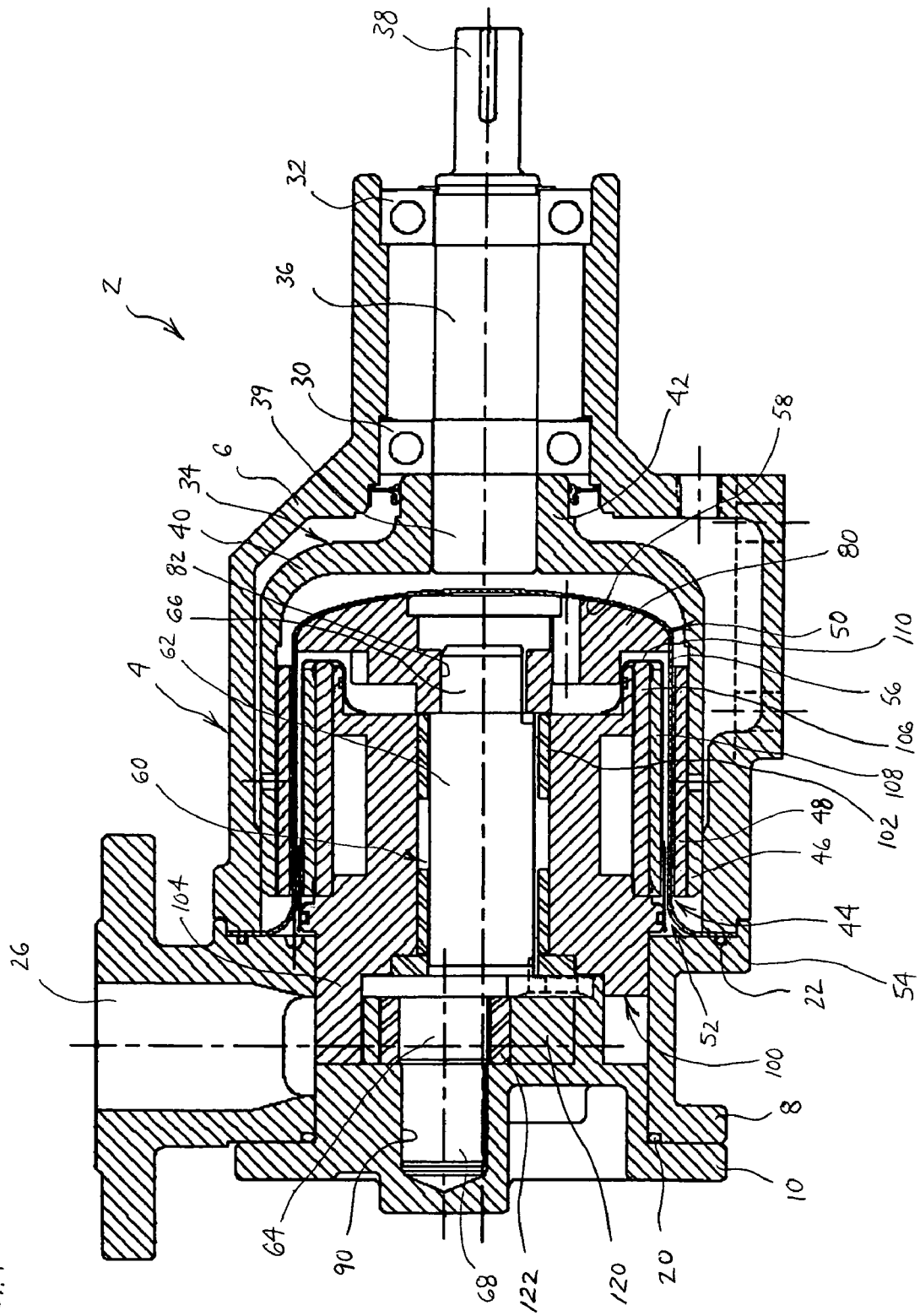
FIG. 1 is a cross-sectional view of a magnetically driven device in the form of a gear pump having an offset stationary pin supported by a convex pin plate within an annular canister consistent with the present invention.

It should be understood that the drawings are not to scale. While considerable mechanical details of a magnetically coupled device, including details of fastening means and other plan and section views of the particular components, have been omitted, such details are considered well within the comprehension of those skilled in the art in light of the present disclosure. It also should be understood that the present invention is not limited to the preferred embodiments illustrated.

DETAILED DESCRIPTION OF THE PREFERRED EMBODIMENTS

Referring generally to FIGS. 1-9, it will be appreciated that the assembly and method for pre-stressing a magnetic coupling canister of the present invention generally may be embodied within numerous configurations of sealless magnetically coupled devices.

Referring to a first preferred embodiment in FIGS. 1-5, an example of a magnetically coupled device 2 is seen in the configuration of a pump having a housing 4 that includes a first body portion 6, a second body portion 8, and a head 10 connected to the second body portion 8. The housing components may be constructed of rigid materials, such as steel, stainless steel, cast iron or other metallic materials, or structural plastics or the like, and may vary in the number of portions and configurations. Housing head 10 is connected to second body portion 8 such as by bolts (not shown), and may be connected by any one of many other suitable constructions. Similarly, first body portion 6 is connected to second body portion 8 by bolts 9, best seen in FIGS. 2A and 2B, or by other suitable constructions.

Annular grooves 20 and 22 accept static seal materials, such as an elastomeric o-ring, preformed or liquid gasket materials or the like, which may be employed to enhance the connections between the housing components by providing sealing engagement. Housing 4 also has an inlet (not shown) for drawing the fluid or medium to be pumped into housing 4, and an outlet 26 for expelling the medium from the pump. It will be appreciated that, as to a magnetically coupled device in the form of a pump, inlet 24 and outlet 26 may be arranged at any angle relative to each other, and that the pump may have more than one inlet and more than one outlet.

Mounted in first body portion 6 of housing 4 are bearings 30, 32 which rotatably support annular magnetic drive assembly 34. Bearings 30, 32 may be of various constructions, such as ball or roller bearings, bushings or the like. Drive assembly 34 includes shaft 36 which rotatably engages bearings 30, 32, and which may be coupled at a first end 38 to an external power source (not shown), such as a motor or the like. Rotatable annular magnetic drive assembly 34 also includes a cup-shaped magnetic drive member 40 connected at its first end 42 to the second end 39 of rotatable shaft 36 and having a recess 44 at a second end 46. Alternatively, bearings 30, 32, and shaft 36 may be eliminated in favor of mounting cup-shaped drive member 40 directly on the shaft of an external power source. Drive member 40 may be connected to shaft 36, such as by a key and keyway (not shown), although it will be appreciated that such connection may be by alternative means, as noted above with respect to the connection of the housing portions. Similarly, drive member 40 and shaft 36 may be integrally formed as one piece. Drive member 40 may be constructed of a rigid material, such as that discussed in relation to the housing.

Drive assembly 34 also has magnets 48 connected to the inner walls of cup-shaped drive member 40 within recess 44. Magnets 48 may be of any configuration, but are preferably rectangular and are may be connected to drive member 40 by any one of many acceptable means, such as by epoxy or adhesives, or by suitable fasteners, such as by rivets or the like.

Disposed at least partially within recess 44 of annular magnetic drive assembly 34 is a cup or bell-shaped canister 50. Canister 50 may be constructed of any of a variety of fairly rigid non-magnetic materials, and the material is typically chosen based on the fluid or medium to which is will be exposed, but is preferably made of stainless steel, aluminum or other metal alloy, but also may be of plastic, composite materials or the like. Canister 50 is open at one end forming a recess 52, has a peripheral rim 54, and an outer annular wall 56. Peripheral rim 54 of canister 50 may be connected in sealing engagement to pump housing 4 in various ways, one of which is shown in FIGS. 1-2B where it is captured between first body portion 6 and second body portion 8 at their connection, and is in sealing engagement with o-ring 22 in this example.

The magnetically coupled device 2 includes an offset stationary shaft or pin 60 having a first pin portion 62 and a second pin portion 64 parallel to but spaced from the longitudinal axis of first pin portion 62. First pin portion 62 extends within recess 52 of canister 50 and is supported at that respective end 66 by a support member, such as pin plate 80. Pin plate 80 is essentially of convex shape on a first side, which corresponds to the inner end wall 58 of canister 50. Pin plate 80 receives pin end 66 within a bore 82 on its opposite side. Second pin portion 64 has end 68 which is received in bore 90 in head 10.

Figure 2:
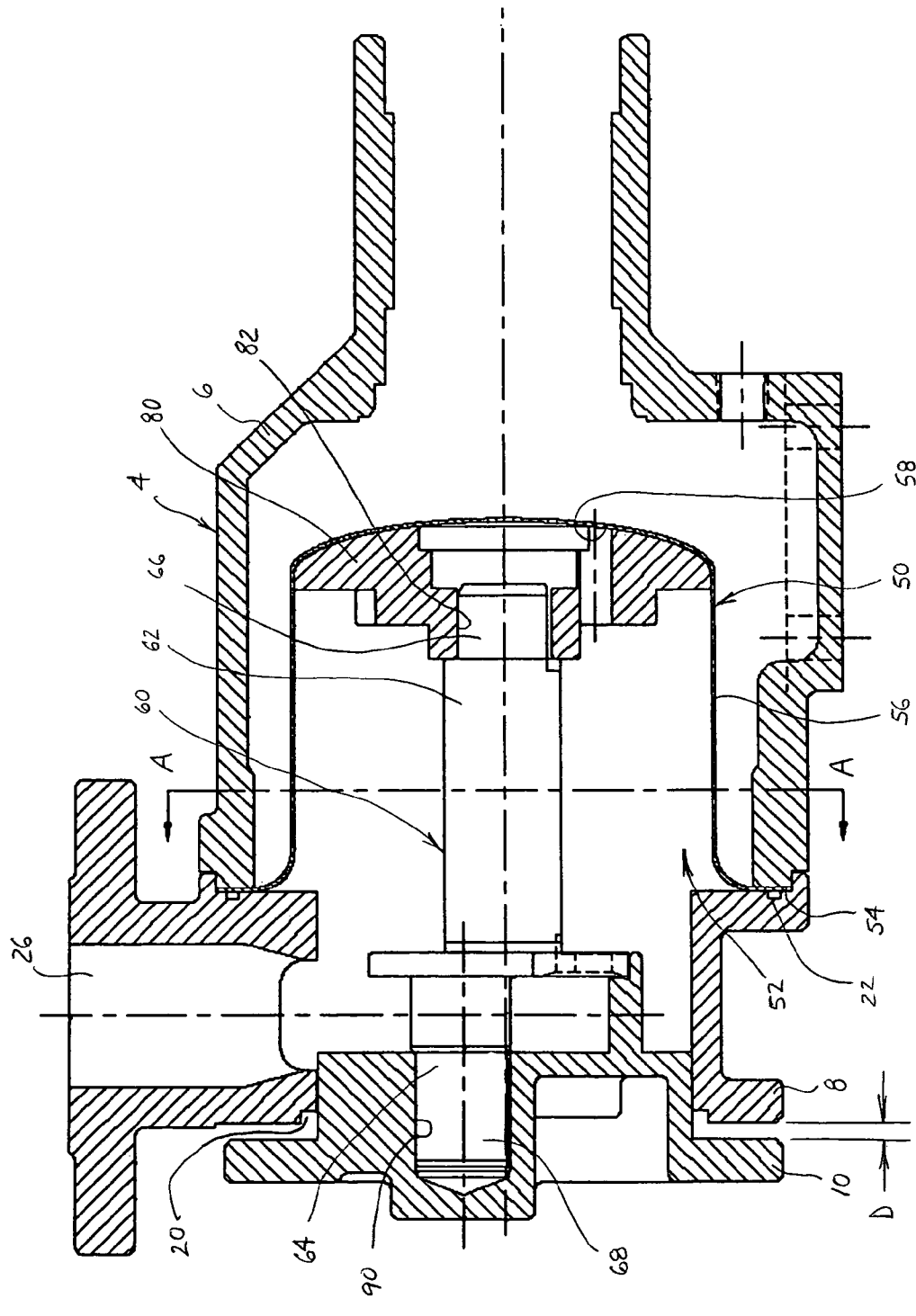
FIG. 2 is a cross-sectional view of the device of FIG. 1 with the driven magnet and rotor assembly removed and the housing head not fully installed (canister is not stretched).
Figure 2A:
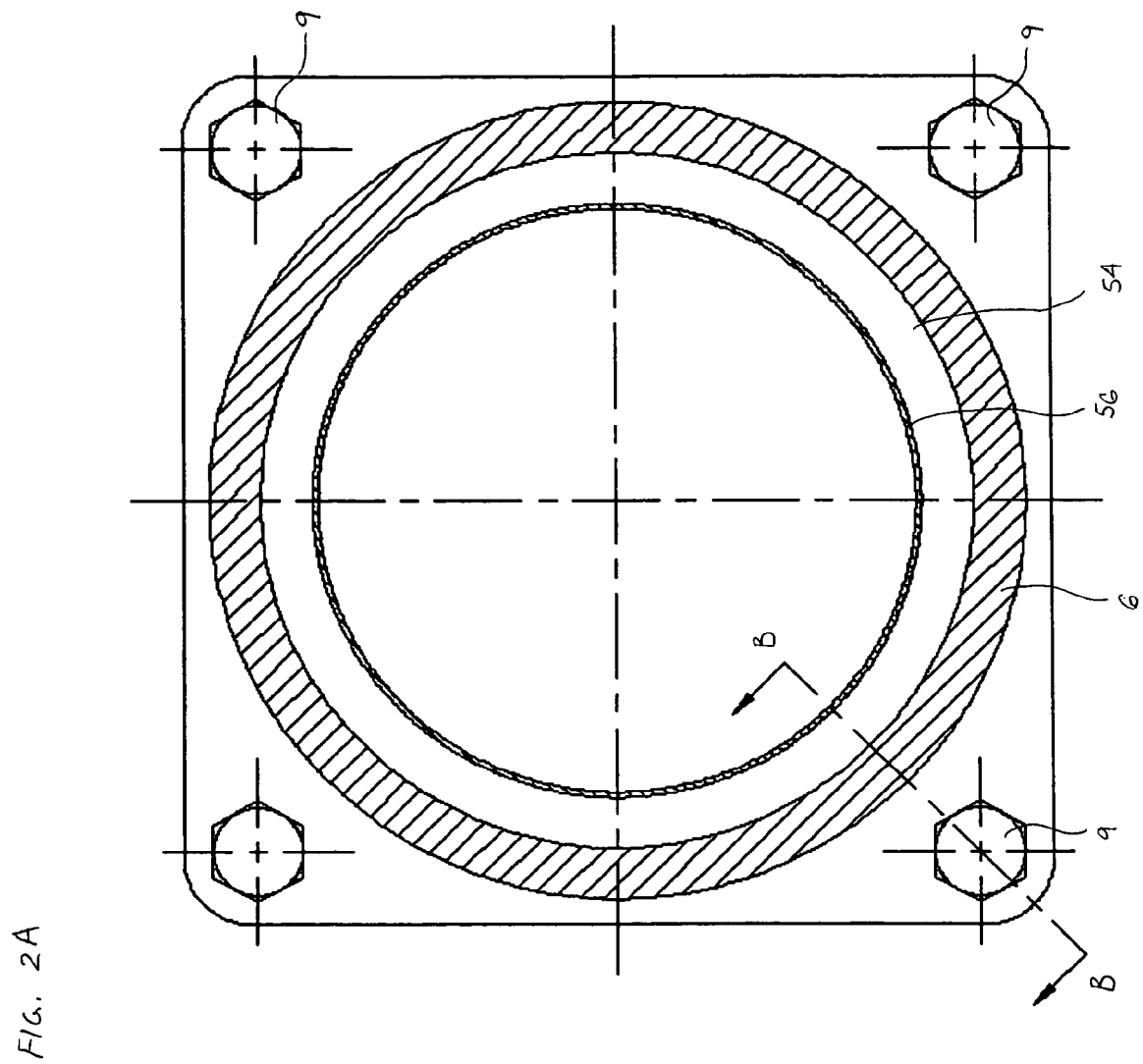
FIG. 2A is a cross-sectional view of the device of FIG. 2 taken through the section line A-A shown in FIG. 2.
Figure 2B:
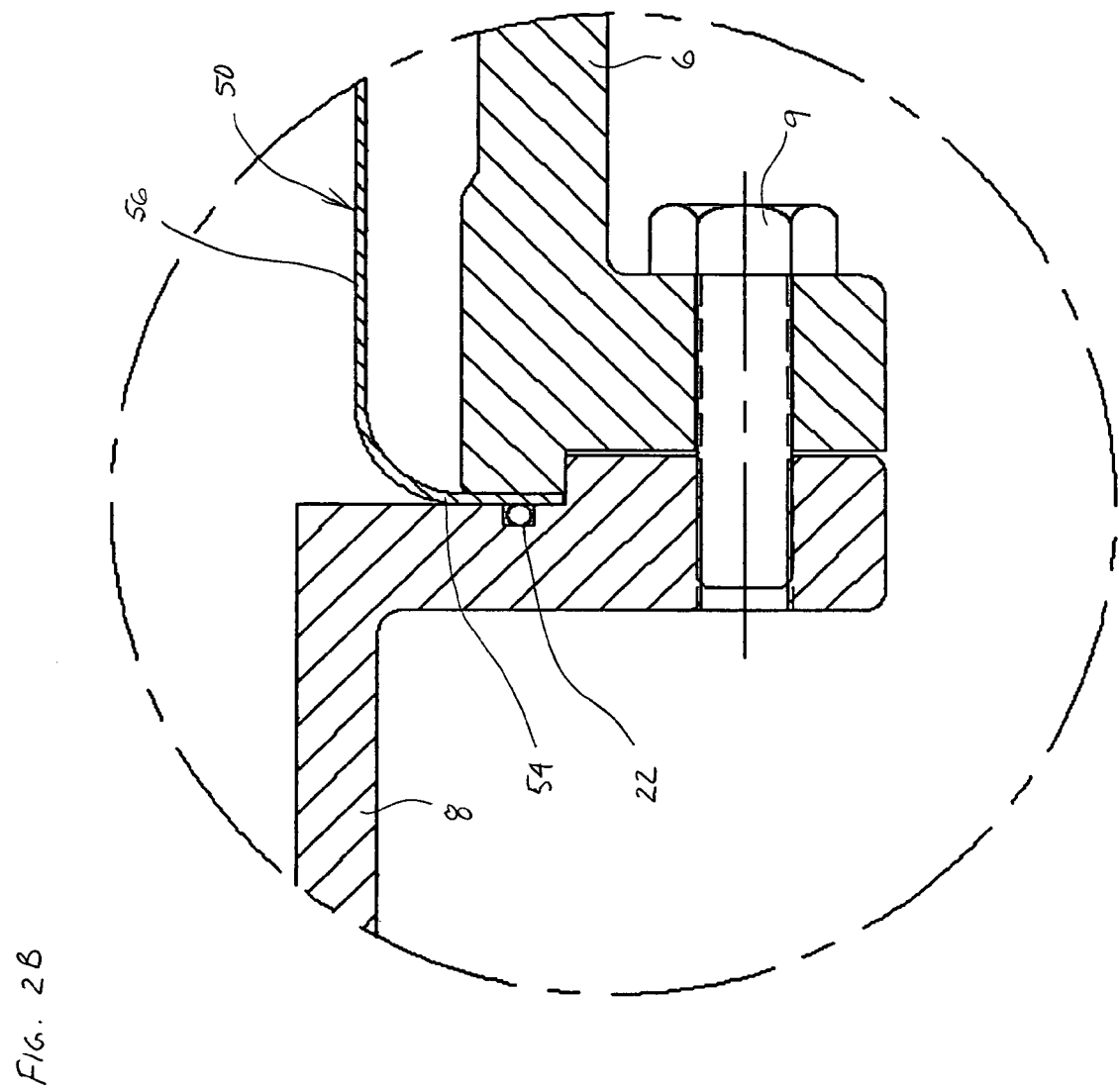
FIG. 2B is a further cross-sectional view of the canister mounting in FIG. 2A taken through the section line B-B shown in FIG. 2A.

In the preferred embodiment in FIG. 1, the magnetically coupled device 2, shown for example as a pump, also includes an annular driven magnet and rotor gear assembly 100 which rotatably engages first pin portion 62 of offset stationary pin 60 and may employ friction reducing means such as bushings 102, or other suitable bearing structures. Magnet and rotor gear assembly 100 has a rotor gear portion 104 disposed toward the second pin portion 64, and a magnet mounting portion 106 connected to rotor gear portion 104 either integrally, or by suitable means of fixedly joining the components. Rotor gear portion 104 may be of various constructions, such as in the form of an outer gear of an internal gear pump. Rotor gear portion 104 also may be constructed of various rigid materials, depending on the medium to be pumped. For instance, it may be preferable to make rotor gear portion 104, as well as the magnet mounting portion of steel when such a pump is intended for use in pumping non-corrosive materials.

Attached to the outer periphery of magnet mounting portion 106 are magnets 108, which may be similar to magnets 48 and may be attached in a similar manner to that employed to connect magnets 48 to drive member 40. A stainless steel sleeve 110 may be mounted over the magnets and magnet mounting portion 106, or other means may be utilized for further protection. Magnet mounting portion 106 and magnets 108 are disposed within recess 52 of canister 50, so as to be separated from magnets 48 of annular magnetic assembly 34 by annular canister 50, but they are arranged to place the respective magnets 108 and 48 in substantial alignment to form a magnetic coupling. This magnetic coupling allows annular magnet and rotor gear assembly 100 to have no physical contact with but be rotated and thereby driven by rotation of annular magnetic drive assembly 34.

As previously noted, offset stationary pin 60 includes a second pin portion 64. As shown in the preferred embodiments in FIG. 1, offset pin 60 may be of continuous construction or may be constructed with multiple joined portions. Second pin portion 64 has an end 68, which is opposite pin end 66 of first pin portion 62. It will be appreciated that as was discussed with respect to pin end 66, support may be provided for pin end 68, as is shown with pin end 68 in bore 90 of housing head 10.

It is desirable for annular driven magnet and rotor gear assembly 100 to have some form of thrust bearing surfaces. As is shown in FIG. 1, a thrust bearing 112 may be provided on offset stationary pin 60. Additional provision for thrust bearings may be employed but are not shown.

In the example of the pump shown in FIG. 1, further mounted for rotation on second pin portion 64 is an idler gear 120. Friction reducing means, such as bushing 122 or bearings, may be used. Idler gear 120 is arranged to engage rotor gear portion 104 via a meshing of gear teeth on idler gear 120 and on rotor gear portion 104, as is known in devices of this type. In operation of the device 2, an external power source rotates annular magnetic drive assembly 34, and the magnetic coupling discussed above causes annular driven magnet and rotor gear assembly 100 to rotate. Rotation of magnet and rotor gear assembly 100 and the intermeshing of the teeth of rotor gear portion 104 with the teeth of idler gear 120 causes idler gear 120 to rotate as well, to operate the pump to create the pumping action by well known principles. In this arrangement, the medium to be pumped is drawn into the device 2 through inlet 24 and is expelled under pressure from outlet 26.

Unfortunately, during pump operation, at times, canister 50 is subjected to cyclic hydraulic pressure loads. These loads tend to try to repeatedly expand canister 50 and stretch it in the longitudinal direction. Due to the cyclic nature of these loads, such canisters in magnetically coupled devices tend to have a limited fatigue life, or have relatively thick canister walls leading to excessive heat generation and a less effective magnetic coupling. In the present invention, the fatigue life of canister 50 is significantly increased by pre-stressing canister 50 by stretching canister 50 in the longitudinal direction. This is accomplished by the unique assembly of canister 50 and corresponding pin plate 80, pin 60 and housing head 10, which are adapted to result in canister 50 being stretched, and thereby pre-stressed in the longitudinal direction when the magnetic coupling device 2 is finally assembled.

Figure 3:
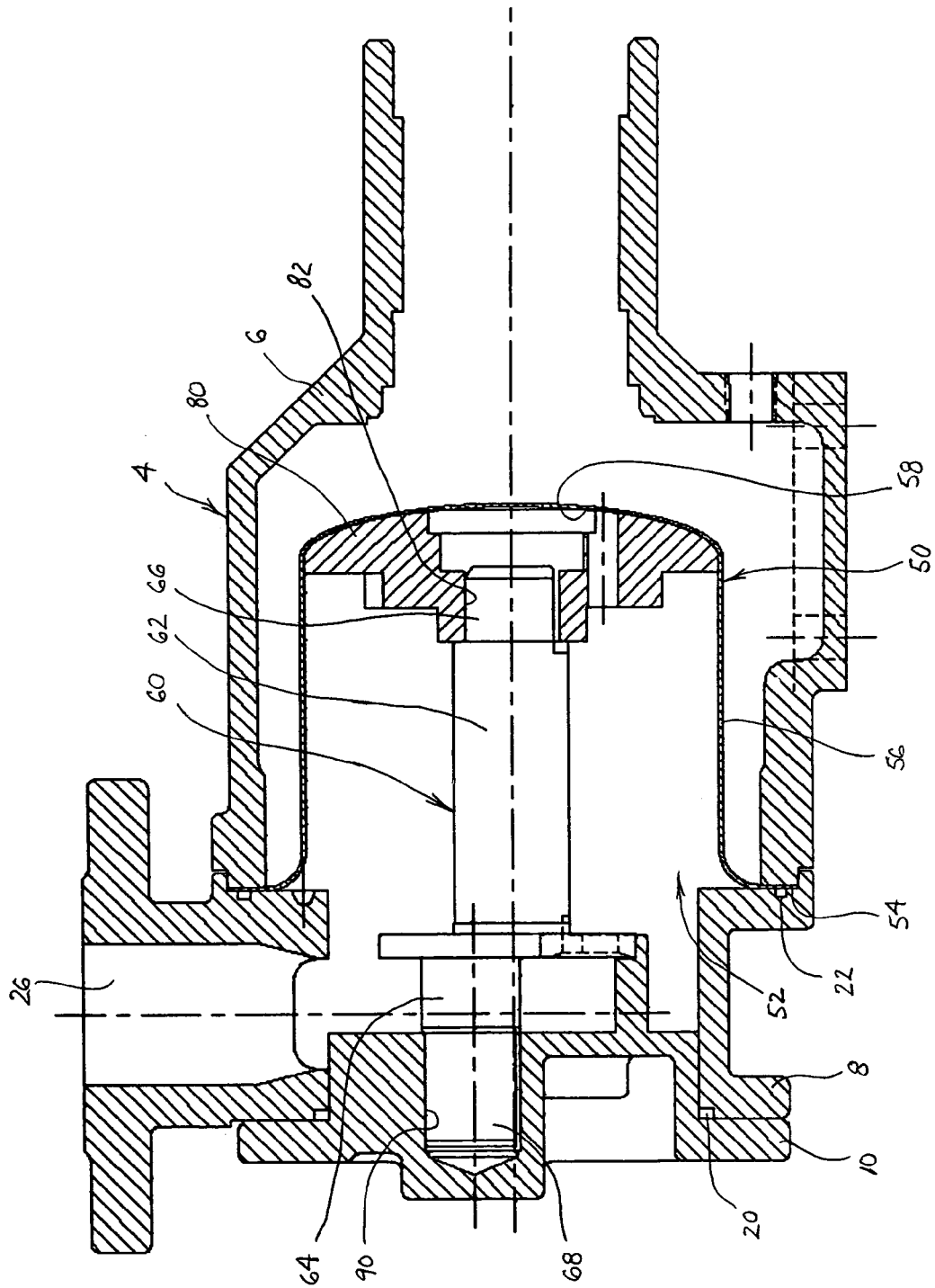
FIG. 3 is a cross-sectional view of the components shown in FIG. 2 but with the housing head fully installed (canister is stretched).
Figure 4:
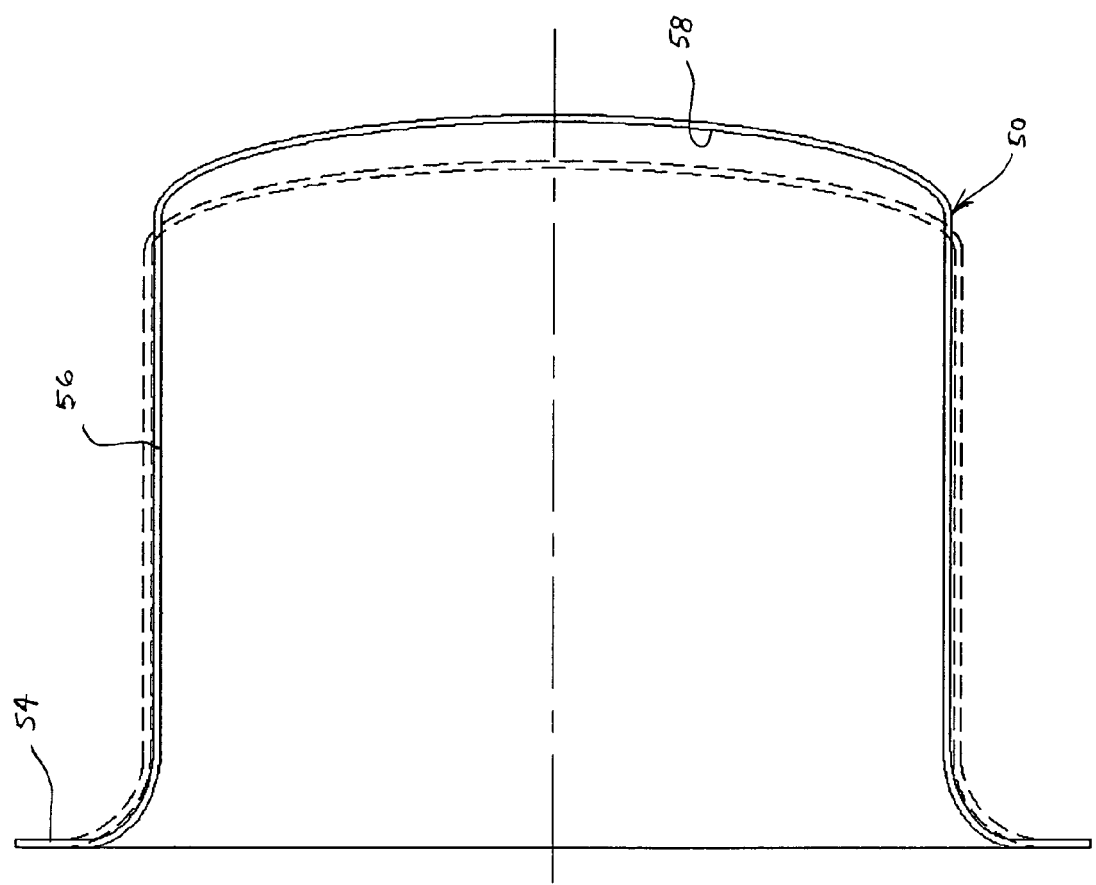
FIG. 4 is a cross-sectional view of the canister of FIGS. 1-3 in a relaxed condition as would be seen in FIG. 2 (dashed lines) and in a stretched condition as would be seen in FIGS. 1 and 3 (solid lines), consistent with the invention.

The beneficial stretching and pre-stressing of canister 50 are accomplished by selecting components whereby canister 50 is slightly shorter in length than the components that are to be housed within it in the assembled device 2. To better illustrate this, in FIGS. 2 and 3 annular magnetic drive assembly 34 and annular driven magnet and rotor gear assembly 100 have been removed. As seen in FIG. 2, with the present invention, housing head 10 is a distance D from, and is not seated against second body portion 8 of housing 4, despite the fact that pin plate 80 is engaging the inner end wall 58 of canister 50, pin end 66 is fully seated in pin plate 80, and opposite pin end 68 is fully seated in housing head 10. Thus, when housing head 10 is clamped to and fully engages second housing portion 8, as shown in FIG. 3, canister 50 is in a stretched and pre-stressed state.

As previously noted above, this pre-stressed condition significantly benefits the fatigue life of canister 50. As a further benefit, pin plate 80 may be designed and constructed for ease of installation in canister 50 by providing it with an outer diameter that is slightly smaller than the inner diameter of canister 50. This dimensioning permits a slip fit of pin plate 80 within canister 50 when canister 50 is in its static, unstretched condition. While in prior art devices this type of fit normally would be undesirable for accurate centering of a pin plate within a canister, in the present invention, upon installation of the respective components and mounting of housing head 10, canister 50 will be stretched which, in turn, tends to cause annular side wall 56 of canister 50 to collapse slightly inward.

Annular side wall 56 collapses inward until it engages the outer annular wall of pin plate 80, thereby automatically centering and holding pin plate 80 with respect to canister 50. In addition, pin 60 is clamped in position axially without the use of any extra features, such as threads, keys or other fasteners. These additional benefits permit tighter control of the axial space between pin plate 80 and housing head 10, because the tolerances of canister 50, pin plate 80, second body portion 8 and housing head 10 are less critical.

As housing head 10 is installed, such as with bolts or other fasteners, gap D between housing head 10 and second body portion 8 is closed until these two housing portions engage each other, and canister 50 is stretched longitudinally a relatively similar distance. The longitudinal stretching and deflection in the web between peripheral rim 54 and annular side wall 56 of canister 50 is depicted in FIG. 4, again in a somewhat exaggerated manner. While the distance D is exaggerated in the present drawings for illustration purposes, the desired length of stretch is dependent upon the type of material used for the construction of canister 50, the wall thickness of canister 50, and the desired pre-stress and collapsing of annular side wall 56 of canister 50 that is to be achieved.

It has been found that a further influence on the extent and effectiveness of the stretching of canister 50 may be had by varying the shape of the end of pin plate 80 where it engages the inner end wall 58 of canister 50. This also can have a fairly pronounced affect on the tendency of annular side wall 56 to collapse inward to center and hold pin plate 80. Thus, the relative convex shape of pin plate 80 and its correspondence to the shape of inner wall end 58 of canister 50 may be chosen for particular benefits.

Figure 5:
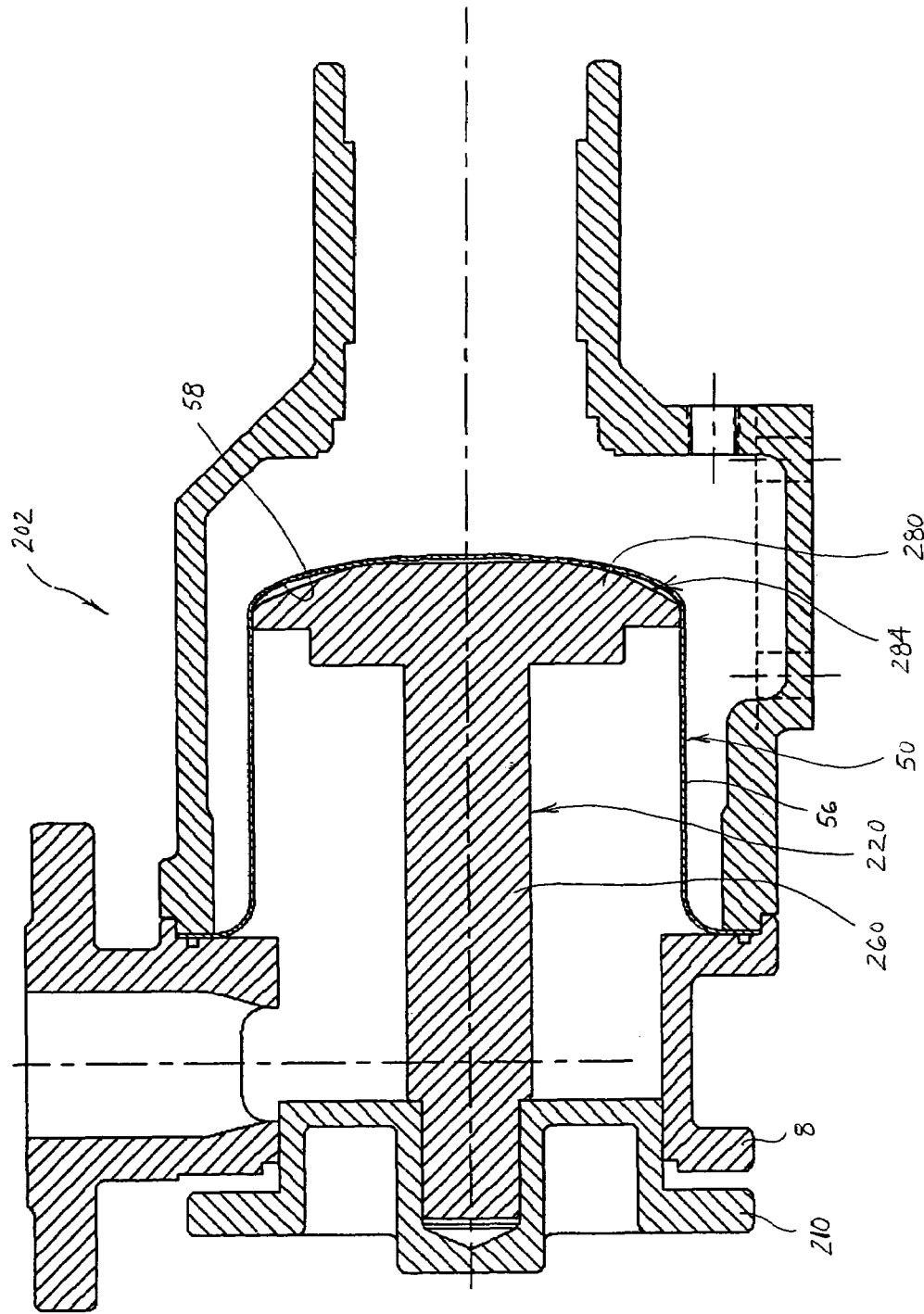
FIG. 5 is a cross-sectional view of an alternative preferred embodiment of a magnetically driven device similarly in the form of a gear pump but having an integral pin and pin plate within an annular canister consistent with the present invention and having the housing head not fully installed (canister is not stretched).

FIG. 5 presents an alternative embodiment of a magnetic coupling device 202, with magnetic drive and driven components removed to better illustrate this additional adaptation of the present invention. The embodiment of FIG. 5 utilizes an integral pin and pin plate 220 and an alternative housing head 210. In this embodiment, pin portion 260 is straight and pin plate portion 280 has an end 284 having a curvature that is not identical to that of the inner end wall 58 of canister 50. It will be appreciated from FIG. 5 that a variety of different configurations may be employed to achieve the benefits of the present invention, which include at least the pre-stressing of canister 50 by way of reaching a stretched state of canister 50 during assembly of magnetic coupling device 202, as well as the automatic self centering of pin plate portion 280 and thereby pin portion 260 of integral pin and pin plate 220. As with the first preferred embodiment, housing head 210, pin and pin plate 220 and canister 50 are fully axially engaged prior to housing head 210 achieving its fully connected position in engagement with second housing body 8. Thus, when housing head 210 in FIG. 5 is fully connected or installed, canister 50 will be stretched to a pre-stressed position, and canister annular side wall 56 will collapse inward and automatically center and hold pin plate portion 280.

Figure 6:
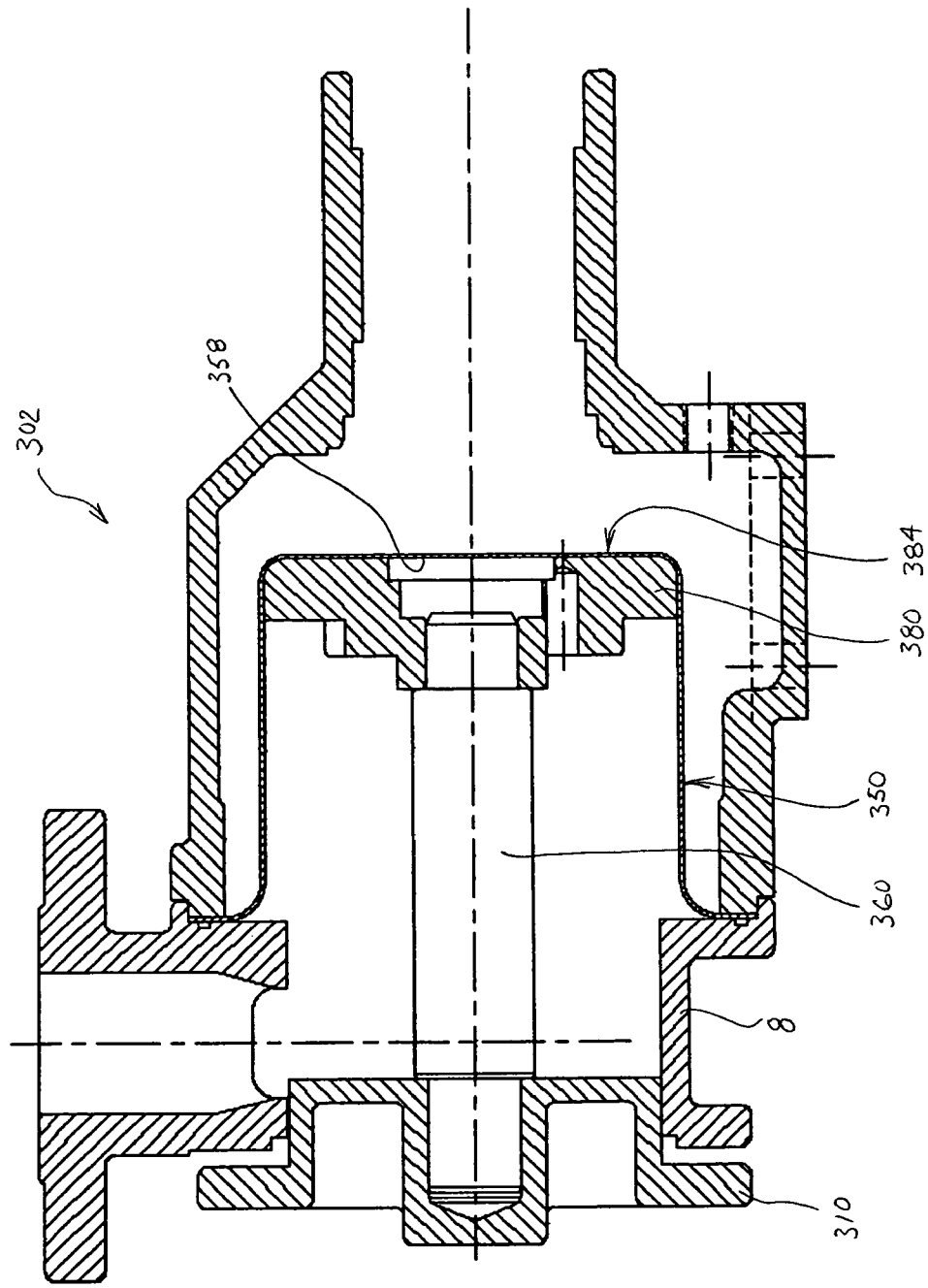
FIG. 6 is a cross-sectional view of a third preferred embodiment of a magnetically driven device similarly in the form of a gear pump but having a straight stationary pin supported by a flat pin plate within an annular canister consistent with the present invention and having the housing head not fully installed (canister is not stretched).

FIG. 6 presents a third preferred embodiment which demonstrates still further adaptations of the present invention. For ease of illustration, the embodiment of FIG. 6 also is shown in the form of a pump, although it is understood that a variety of magnetic coupling devices may be constructed within the spirit and scope of the invention without such devices being a pump. Nevertheless, in the magnetic coupling device 302 of FIG. 6, a housing head 310 is used with a straight pin 360 and a separate pin plate 380. In this embodiment, pin plate 380 has a flat end 384, and canister 350 has a corresponding flat inner end wall 358 and annular side wall 356. As with the prior embodiments, once housing head 310 is fully mounted and seated against second housing portion 8, canister 350 will be stretched in the longitudinal direction and annular side wall 356 will tend to collapse inward to a point of centering pin plate 380.

Figure 7:
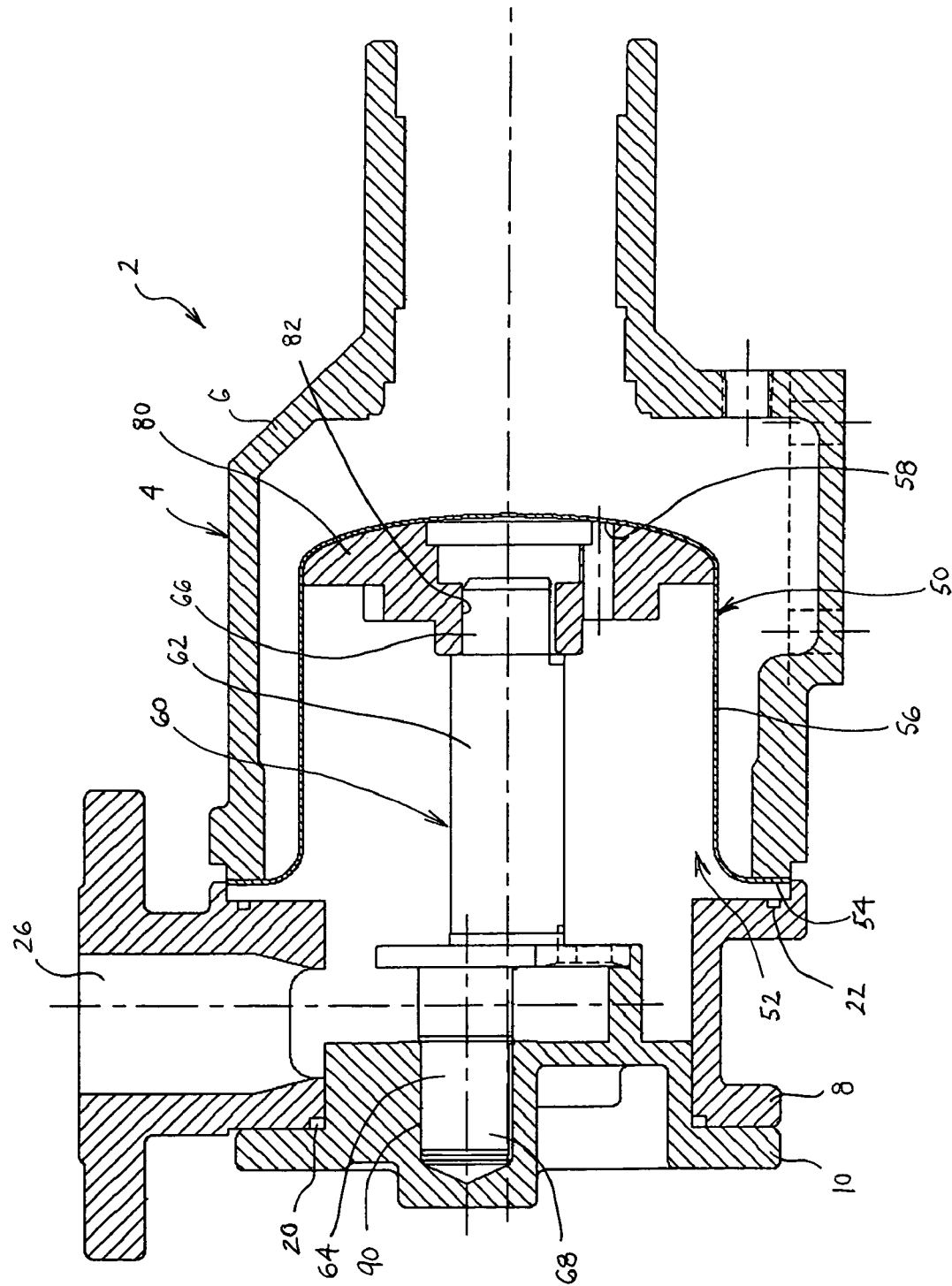
FIG. 7 is a cross-sectional view of the preferred embodiment of a magnetically driven device shown in FIGS. 1-3 and consistent with the present invention but having the housing head fully mounted and the canister awaiting full mounting in sealing engagement with a housing body portion (canister is not stretched).

In FIG. 7, the magnetic coupling device 2 of FIGS. 1-3 is shown, but instead of last connecting housing head 10 to move pin 60 and pin plate 80 toward canister inner end wall 58, housing head 10 is connected to second body portion 8 prior to first body portion 6 being connected thereto. As first body portion 6 is moved toward second body portion 8, canister 50 is moved toward pin 60 and pin plate 80 and is pre-stressed as it is stretched in the longitudinal direction. Thus, in terms of relative movement, pin 60 and pin plate 80 are moved toward inner end wall 58 of canister 50 in the final assembly regardless of the order in which housing head 10 and canister 50 are connected to and achieve sealing engagement with a housing portion, such as second body portion 8.

Figure 8:
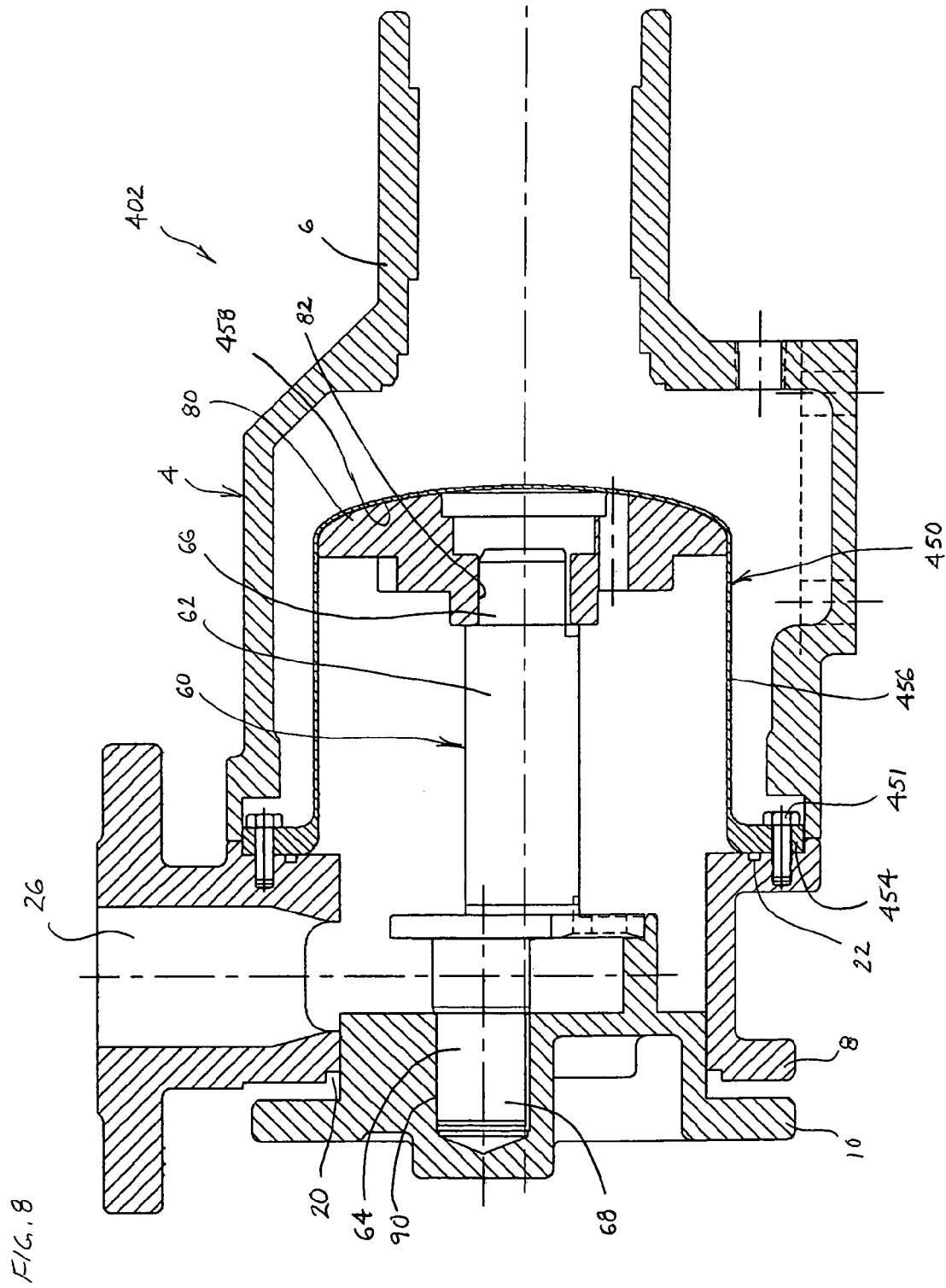
FIG. 8 is a cross-sectional view of a fourth preferred embodiment of a magnetically driven device similar to the embodiment of FIG. 2 and consistent with the present invention but an alternative canister mounting and having the housing head not fully installed (canister is not stretched).
Figure 9:
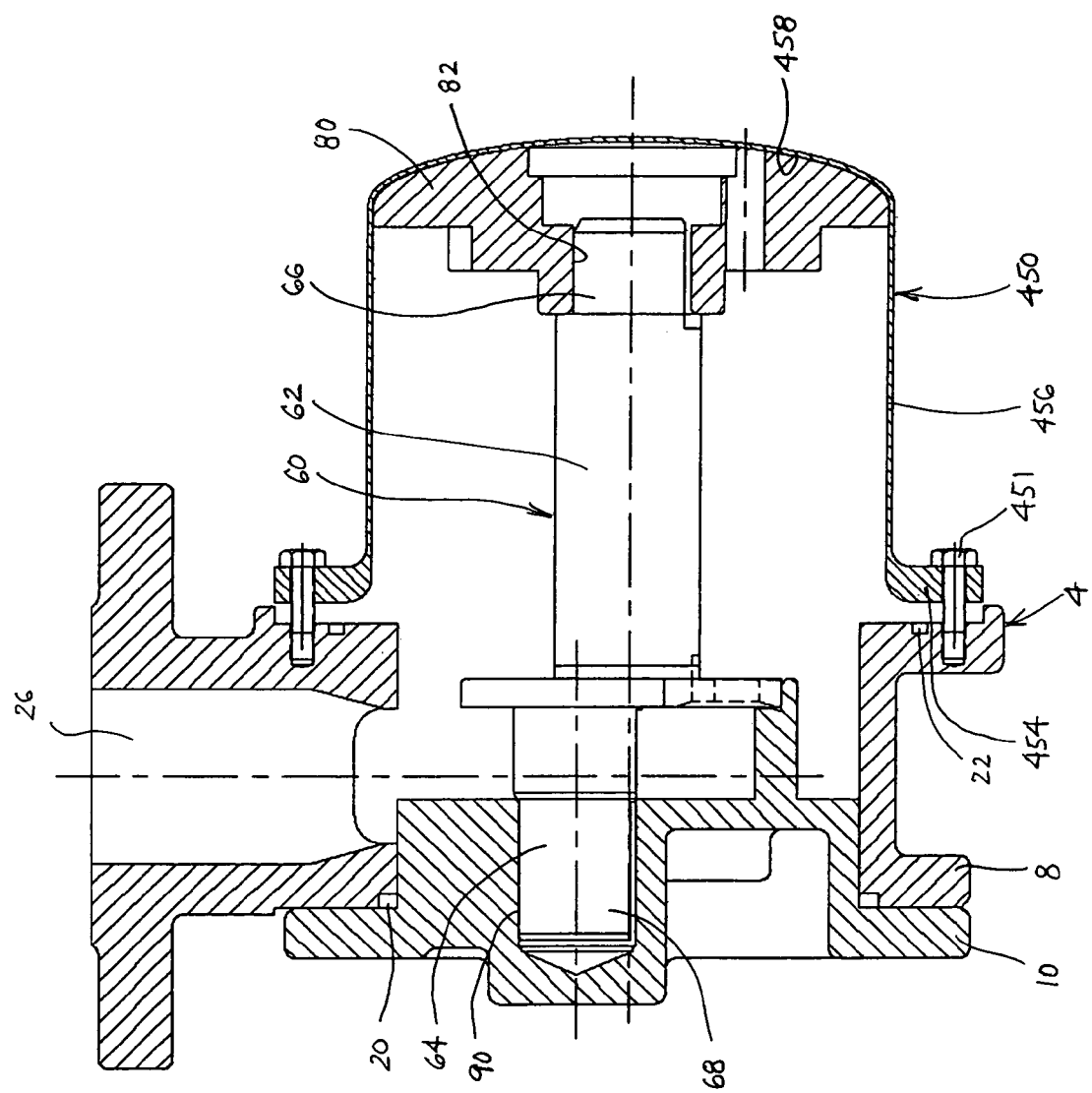
FIG. 9 is another cross-sectional view the fourth preferred embodiment of a magnetically driven device shown in FIG. 8, but alternatively having the housing head fully mounted and the canister awaiting full mounting in sealing engagement with a housing body portion (canister is not stretched).

FIGS. 8 and 9 present a fourth preferred embodiment of a magnetically coupled device 402 consistent with the present invention which is very similar to that shown in FIG. 2. However, this embodiment has an alternative canister 450 having a peripheral rim 454, side wall 456, and inner end wall 458. Canister 450 is separately connected to second body portion 8 via fasteners 451 through peripheral rim 454. This embodiment permits first body portion 6 to be connected to second body portion 8 separately from the connection of canister 50 to second body portion 8. In FIG. 8, canister 450 is connected to second body portion 8 in advance of connecting housing head 10 to second body portion 8. FIG. 9 alternatively shows housing head 10 connected to second body portion 8 in advance of connecting canister 450 to second body portion 8. Consistent with the understanding that will be appreciated from the prior preferred embodiments, in either event, canister 450 will be pre-stressed by stretching as the components are connected in sealing engagement to form the completed assembly.

With respect to each of the above preferred embodiments, a method for pre-stressing a magnetic coupling canister within a magnetically couple device may be employed. Namely, to accomplish such pre-stressing of the canister, one may select a housing body and a housing head that is connectable to the housing body. A canister having a side wall, an open end and a closed end also must be selected. The method further includes selecting a pin and pin plate combination and positioning the pin and pin plate combination between the housing head and the canister closed end. Further, the canister is connected to the housing body adjacent the canister open end in sealing engagement therewith and the housing head is connected to the housing body in sealing engagement therewith, thereby moving the pin and pin plate combination toward the closed end of the canister and causing the canister to stretch in a longitudinal direction. The movement of the pin and pin plate toward the closed end of the canister will be understood to be relative movement, in that the pin and pin plate can be advanced toward the closed end of the canister or the canister can be moved toward the pin and pin plate in the direction of the housing head. Also, it will be appreciated that the method of pre-stressing the canister may be performed in additional steps or in a different order of the steps noted. For instance, the pin portion of the pin and pin plate combination first could be inserted into the housing head, whether the pin plate portion is engaged with the pin portion or is separately inserted into the canister, or the pin and pin plate could be inserted into the canister with the housing head being moved toward the respective assembled components thereafter. In any event, to complete the assembly of the magnetically coupled device one must eventually advance the housing head toward its mounted position in which it sealingly engages the housing body and must advance the canister toward its mounted position in which it also sealingly engages the housing body. It is understood that these and other variations in the assembly of the components to cause the pre-stressing of the canister may be derived from the present disclosure and are considered to be within the spirit and scope of the invention.

Thus, in practicing the invention it can be seen that a canister and housing head are mounted to a housing body, with a pin portion and pin plate portion having been placed into a position wherein the pin plate portion engages the inner end wall of the canister while a first end of the pin portion engages the pin plate portion, and a second end of the pin plate portion engages the housing head, and as the housing head and canister are connected to the housing body, the canister is longitudinally stretched. It also will be appreciated from the foregoing disclosure that as the housing head and canister are connected to the housing body and cause the canister to stretch, this method of assembly further simultaneously causes the canister to collapse radially inward to engage and center the pin and pin plate portions.

It will be appreciated that an assembly and method for pre-stressing a magnetic coupling canister have been presented in a variety of structures and that such can be achieved in accordance with the present invention with various configurations. Moreover, any variety of suitable materials of construction, configurations, shapes and sizes for the components and methods of connecting the components may be utilized to meet the particular needs and requirements of an end user. It will be apparent to those skilled in the art that various modifications can be made in the design and construction of magnetically coupled devices without departing from the scope or spirit of the present invention, and that the claims are not limited to the preferred embodiments illustrated.

What is claimed is:

1. An assembly for pre-stressing a canister within a magnetically coupled device comprising: a housing body having at least one housing portion; a housing head connectable to said housing body; a canister having a side wall, an open end and a closed end; said canister connectable to said at least one housing portion of said housing body adjacent said canister open end; a pin and pin plate combination disposed between said housing head and said canister closed end; and wherein said at least one housing portion, said housing head, said pin and pin plate combination and said canister are adapted to cause said canister to stretch in a longitudinal direction when said housing head and said canister are connected in sealing engagement with said housing body.

2. An assembly for pre-stressing a canister within a magnetically coupled device in accordance with claim 1, wherein the pin plate engages the closed end of the canister.

3. An assembly for pre-stressing a canister within a magnetically coupled device in accordance with claim 1, wherein the pin and pin plate combination is supported within the canister.

4. An assembly for pre-stressing a canister within a magnetically coupled device in accordance with claim 1, wherein the canister side wall collapses inward as the canister is stretched in the longitudinal direction.

5. An assembly for pre-stressing a canister within a magnetically coupled device in accordance with claim 4, wherein the pin and pin plate are automatically centered relative to the canister when the canister side wall collapses inward.

6. An assembly for pre-stressing a canister within a magnetically coupled device in accordance with claim 1, wherein a pin portion of the pin and pin plate combination is supported in the housing head at an end opposite a pin plate portion of the pin and pin plate combination.

7. An assembly for pre-stressing a canister within a magnetically coupled device in accordance with claim 1, wherein a pin portion of the pin and pin plate combination is straight.

8. An assembly for pre-stressing a canister within a magnetically coupled device in accordance with claim 1, wherein a pin portion of the pin and pin plate combination further comprises two portions which have offset longitudinal axes.

9. An assembly for pre-stressing a canister within a magnetically coupled device in accordance with claim 1, wherein the pin and pin plate combination is constructed as an integrally formed single component.

10. An assembly for pre-stressing a canister within a magnetically coupled device in accordance with claim 1, wherein the pin and pin plate combination comprises an assembly of at least two components.

11. An assembly for pre-stressing a canister within a magnetically coupled device in accordance with claim 1, wherein when the canister is stretched the closed end of the canister conforms in shape to a preselected shape of a pin plate portion of the pin and pin plate combination.

12. An assembly for pre-stressing a canister within a magnetically coupled device in accordance with claim 11, wherein prior to when the canister is stretched the closed end of the canister has a preselected shape which is not the same as the preselected shape of a pin plate portion.

13. A method of pre-stressing a canister within a magnetically coupled device comprising the steps of: selecting a housing body having at least one housing portion and a housing head that is connectable to said housing body; selecting a canister having a side wall, an open end and a closed end; selecting a pin and pin plate combination and positioning said pin and pin plate combination between said housing head and said canister closed end; and connecting the canister adjacent the canister open end to the housing body in sealing engagement with said housing body and connecting said housing head to said housing body in sealing engagement with said housing body, thereby moving said pin and pin plate combination toward said closed end of said canister and causing said canister to stretch in a longitudinal direction.

14. A method of pre-stressing a canister within a magnetically coupled device in accordance with claim 13, wherein the step of selecting a pin and pin plate combination further comprises selecting a pin and pin plate combination which is constructed as an integrally formed single component.

15. A method of pre-stressing a canister within a magnetically coupled device in accordance with claim 13, wherein the step of selecting a pin and pin plate combination further comprises selecting a pin and pin plate combination which is constructed as an assembly of at least two components.

16. A method of pre-stressing a canister within a magnetically coupled device in accordance with claim 13, wherein the step of selecting a pin and pin plate combination further comprise selecting a pin plate portion which is capable of being slip fit within the canister.

17. A method of pre-stressing a canister within a magnetically coupled device in accordance with claim 13, wherein the step of connecting said canister and said housing head into sealing engagement with said housing body further simultaneously causes the side wall of the canister to collapse inward to engage a pin plate portion of the pin and pin plate combination.

18. A method of pre-stressing a canister within a magnetically coupled device in accordance with claim 17, wherein the step of connecting said canister and said housing head into sealing engagement with said housing body further simultaneously causes the pin and pin plate combination to be centered with respect to the side wall of the canister.

19. A method of pre-stressing a canister within a magnetically coupled device comprising the steps of: selecting a housing body of a magnetically coupled device having at least one housing portion; selecting a housing head that is connectable to said housing body, and a canister that is connectable to said housing body; selecting and placing a pin portion and a pin plate portion in respective positions wherein the pin plate portion will engage an inner end wall of the canister while a first end of the pin portion will engage the pin plate portion and a second end of the pin portion will engage the housing head; connecting the canister and housing head to the housing body and in sealing engagement with the housing body, thereby stretching the canister in a longitudinal direction.

20. A method of pre-stressing a canister within a magnetically coupled device in accordance with claim 19, wherein connecting the housing head and canister in sealing engagement with the housing body simultaneously causes the canister to collapse radially inward to engage and automatically center the pin plate portion with respect to the canister.

* * * * *